US011808875B2

(12) United States Patent
Garner et al.

(10) Patent No.: US 11,808,875 B2
(45) Date of Patent: *Nov. 7, 2023

(54) MOBILE DEVICE BASED CONTROL DEVICE LOCATOR

(71) Applicant: Roku, Inc., San Jose, CA (US)

(72) Inventors: Gregory Mack Garner, Los Gatos, CA (US); Patrick Alan Brouillette, Los Gatos, CA (US)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,614

(22) Filed: May 4, 2022

(65) Prior Publication Data

US 2022/0260669 A1 Aug. 18, 2022

Related U.S. Application Data

(63) Continuation of application No. 16/545,426, filed on Aug. 20, 2019, now Pat. No. 11,327,150, which is a
(Continued)

(51) Int. Cl.
*G01S 5/18* (2006.01)
*G01S 3/801* (2006.01)
(Continued)

(52) U.S. Cl.
CPC ............... *G01S 5/18* (2013.01); *G01S 3/80* (2013.01); *G01S 3/801* (2013.01); *G01S 3/802* (2013.01);
(Continued)

(58) Field of Classification Search
CPC ... G01S 5/18; G01S 3/80; G01S 3/801; G01S 3/802; G01S 3/8083; G01S 5/28; H04W 4/02; H04W 64/00
See application file for complete search history.

(56) References Cited

U.S. PATENT DOCUMENTS 8,350,694 B1 1/2013 Trundle et al.
9,669,298 B2 6/2017 Andrews et al.
(Continued)

FOREIGN PATENT DOCUMENTS

EP 3329688 A1 * 6/2018 ............... G01S 3/80
EP 3329688 B1 6/2018
(Continued)

OTHER PUBLICATIONS

Non-Final Office Action dated Jan. 9, 2018 in U.S. Appl. No. 14/813,766 (7 pages).
(Continued)

*Primary Examiner* — Daniel Pihulic
(74) *Attorney, Agent, or Firm* — Sterne, Kessler, Goldstein & Fox P.L.L.C.

(57) ABSTRACT

Disclosed herein are system, apparatus, article of manufacture, method, and/or computer program product embodiments for a mobile device based control device locator. An embodiment operates by receiving a request to locate a control device, transmitting acoustic token transmission information to the control device to activate an electroacoustic transducer on the control device, receiving an acoustic signal including an acoustic token signal from the control device via a plurality of acoustic sensors, and determining distance information of the control device based on the received acoustic token signal generated by the electroacoustic transducer of the control device.

20 Claims, 7 Drawing Sheets

Related U.S. Application Data continuation of application No. 14/813,766, filed on Jul. 30, 2015, now Pat. No. 10,401,473.

(51) Int. Cl.
*G01S 3/802* (2006.01)
*G01S 3/80* (2006.01)
*G01S 3/808* (2006.01)
*H04W 4/02* (2018.01)
*G01S 5/28* (2006.01)
*H04W 64/00* (2009.01)

(52) U.S. Cl.
CPC .............. *G01S 3/8083* (2013.01); *G01S 5/28* (2013.01); *H04W 4/02* (2013.01); *H04W 64/00* (2013.01)

(56) References Cited

U.S. PATENT DOCUMENTS

| | | | |
|---|---|---|---|
| 10,401,473 B2* | 9/2019 | Garner | H04W 4/02 |
| 10,623,796 B2 | 4/2020 | Garner et al. | |
| 10,820,032 B2 | 10/2020 | Garner et al. | |
| 11,327,150 B2* | 5/2022 | Garner | G01S 3/802 |
| 2003/0073432 A1 | 4/2003 | Meade, II | |
| 2004/0048571 A1 | 3/2004 | Kiyose | |
| 2007/0109914 A1 | 5/2007 | McFarland | |
| 2007/0124785 A1 | 5/2007 | Marsico | |
| 2007/0209009 A1 | 9/2007 | Huang | |
| 2008/0060007 A1 | 3/2008 | Matsubayashi et al. | |
| 2008/0304361 A1 | 12/2008 | Peng et al. | |
| 2009/0138805 A1 | 5/2009 | Hildreth | |
| 2009/0158162 A1 | 6/2009 | Imai | |
| 2009/0221298 A1 | 9/2009 | Hanner | |
| 2010/0031306 A1 | 2/2010 | Pandey et al. | |
| 2010/0066904 A1 | 3/2010 | Schindler et al. | |
| 2010/0107185 A1 | 4/2010 | Shintani | |
| 2010/0153885 A1 | 6/2010 | Yates | |
| 2010/0289644 A1 | 11/2010 | Slavin et al. | |
| 2011/0016492 A1 | 1/2011 | Morita | |
| 2011/0069940 A1 | 3/2011 | Shimy et al. | |
| 2011/0164175 A1 | 7/2011 | Chung et al. | |
| 2011/0183603 A1 | 7/2011 | Malik | |
| 2012/0026837 A1 | 2/2012 | Li et al. | |
| 2012/0057580 A1 | 3/2012 | Hansen et al. | |
| 2012/0066626 A1 | 3/2012 | Geleijnse et al. | |
| 2012/0151529 A1 | 6/2012 | Andersson | |
| 2012/0311635 A1 | 12/2012 | Mushkatblat | |
| 2013/0027613 A1 | 1/2013 | Kim et al. | |
| 2013/0185368 A1 | 7/2013 | Nordstrom et al. | |
| 2013/0304789 A1 | 11/2013 | Herlein | |
| 2014/0075575 A1 | 3/2014 | Kim et al. | |
| 2014/0152899 A1 | 6/2014 | Newell | |
| 2014/0249927 A1 | 9/2014 | De Angelo | |
| 2015/0121406 A1 | 4/2015 | Chai et al. | |
| 2015/0189475 A1 | 7/2015 | Schillings | |
| 2015/0193433 A1 | 7/2015 | Dykeman et al. | |
| 2016/0112760 A1 | 4/2016 | Kosseifi et al. | |
| 2016/0127874 A1 | 5/2016 | Kingsmill et al. | |
| 2017/0030999 A1* | 2/2017 | Garner | G01S 3/801 |
| 2017/0034559 A1 | 2/2017 | Garner et al. | |
| 2017/0034560 A1 | 2/2017 | Garner et al. | |
| 2019/0369206 A1* | 12/2019 | Garner | G01S 5/28 |
| 2022/0260669 A1* | 8/2022 | Garner | G01S 5/18 |

FOREIGN PATENT DOCUMENTS

| | | | | |
|---|---|---|---|---|
| EP | 3329688 B1 * | 12/2020 | ............... | G01S 3/80 |
| WO | WO 2014/007754 A2 | 1/2014 | | |
| WO | WO 2017/019691 A1 | 2/2017 | | |
| WO | WO-2017019691 A1 * | 2/2017 | ............... | G01S 3/80 |

OTHER PUBLICATIONS

Non-Final Office Action dated Oct. 24, 2018 in U.S. Appl. No. 14/813,703 (44 pages).
Non-Final Office Action dated Aug. 23, 2017 in U.S. Appl. No. 14/813,703 (35 pages).
Final Office Action dated Jan. 8, 2018 in U.S. Appl. No. 14/813,703 (34 pages).
Non-Final Office Action dated Aug. 16, 2016 in U.S. Appl. No. 14/813,703 (22 pages).
Final Office Action dated Sep. 30, 2016 in U.S. Appl. No. 14/813,703 (26 pages).
Final Office Action dated Mar. 29, 2019 in U.S. Appl. No. 14/813,703 (36 pages).
Final Office Action dated Oct. 5, 2018 in U.S. Appl. No. 14/958,283 (43 pages).
Non-Final Office Action dated Sep. 28, 2016 in U.S. Appl. No. 14/958,283 (25 pages).
Non-Final Office Action dated Nov. 15, 2016 in U.S. Appl. No. 14/958,283 (26 pages).
Final Office Action dated Feb. 24, 2017 in U.S. Appl. No. 14/958,283 (33 pages).
Non-Final Office Action dated Jan. 11, 2018 in U.S. Appl. No. 14/958,283 (37 pages).
Non-Final Office Action dated Apr. 18, 2019 in U.S. Appl. No. 14/958,283 (38 pages).
Final Office Action dated Aug. 23, 2019 in U.S. Appl. No. 14/958,283 (31 pages).
Zhang, Yushi et al., "A Comparative Study of Time-Delay Estimation Techniques Using Microphone Arrays", School of Engineering Report No. 619, Department of Electrical and Computer Engineering, The University of Auckland, Private Bag 92019, 2005, (57 pages).
Khaddour, Hasan, "A Comparison of Algorithms of Sound Source Localization Based on Time Delay Estimation", Department of Telecommunications FEEC, Brno University of Technology, Elektrorevue, vol. 2, No. 1, pp. 31-37, Apr. 2011.
International Search Report and Written Opinion of the International Searching Authority for International Application No. PCT/US2016/043879, dated Oct. 20, 2016 (11 pages).
International Search Report and Written Opinion of the International Searching Authority for International Application No. PCT/US2016/044054, dated Oct. 21, 2016, 11 pages.
Extended European Search Report dated Nov. 15, 2018 in European Application No. 16831242.9, 9 pages.
Extended European Search Report dated Feb. 12, 2019 in European Application No. 16831198.3, 9 pages.
European Provisional Opinion of the Examining Division in Preparation of Oral Proceedings, dated Mar. 1, 2022 in European Application No. 16831198.3, 7 pages.
Anonymous: "Ping (networking utility)—Wikipedia," Jul. 15, 2015 (Jul. 15, 2015), XP055723627, retreived from the Internet: URL:https://en.wikipedia.org/w/index.php?title=Ping_(networking_utility)&oldid=671582153 [retrieved on Aug. 19, 2020].

* cited by examiner

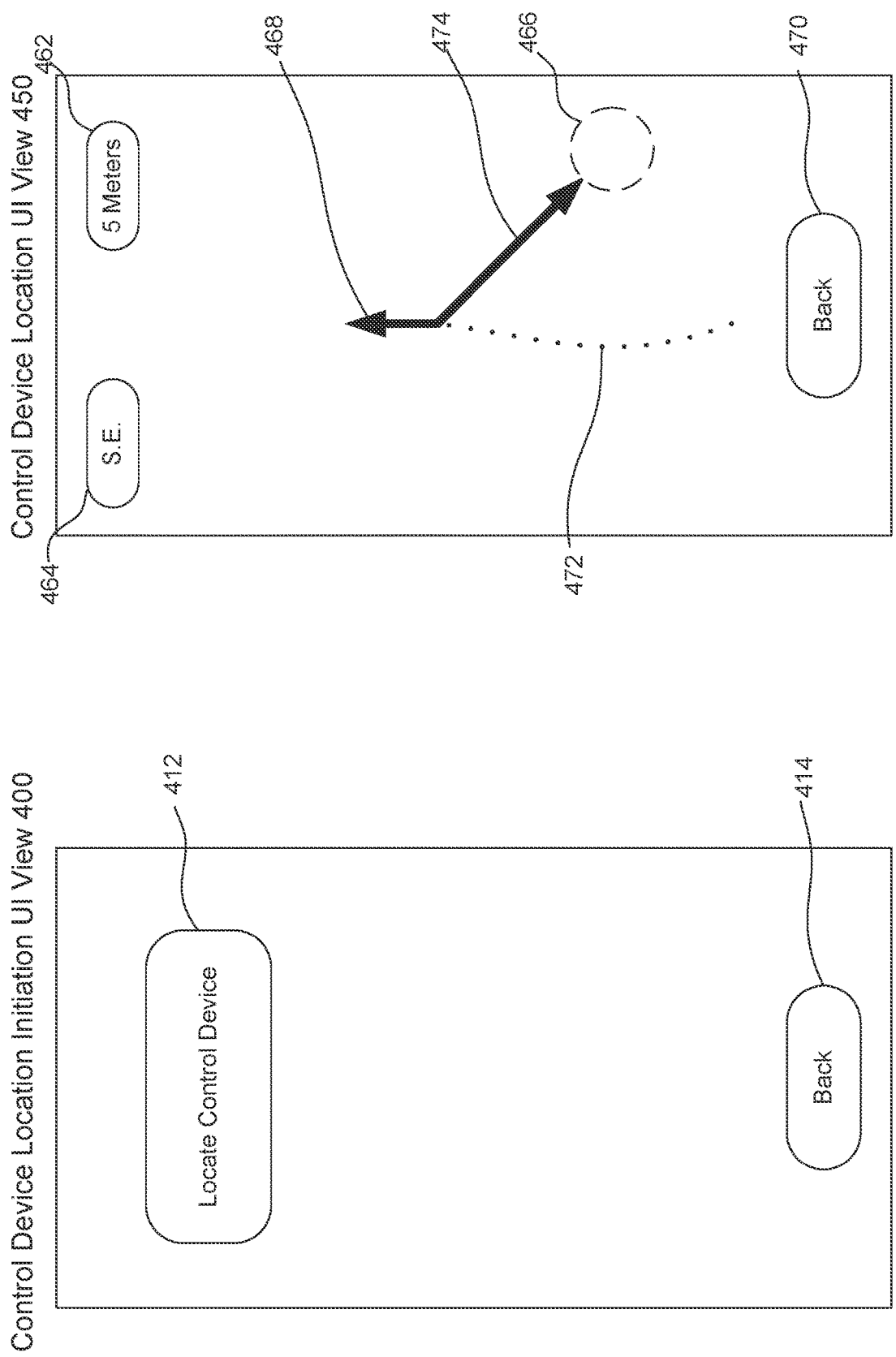

MOBILE DEVICE BASED CONTROL DEVICE LOCATOR

CROSS REFERENCE TO RELATED APPLICATIONS

This application is a continuation of U.S. Non-Provisional patent application Ser. No. 16/545,426, filed Aug. 20, 2019, which is a continuation of U.S. Non-Provisional patent application Ser. No. 14/813,766 titled "MOBILE DEVICE BASED CONTROL DEVICE LOCATOR," filed Jul. 30, 2015, now U.S. Pat. No. 10,401,473, all of which is herein incorporated by reference in their entirety.

BACKGROUND

Field

This disclosure is generally directed to locating a control device using a mobile device. More particularly, this disclosure relates to mobile device based control device locators.

Background

Consumer electronics such as, for example, high definition audio and/or video play back devices, typically provide a remote control to enable a user to operate, select, and/or playback available audio and/or video content on a display connected to the high definition audio and/or video playback device. However, due to the inconspicuous nature of remote controls, consumers or users of a high definition audio and/or video play back device will often not remember or misplace where they may have physically placed the remote control after several hours of non-use. This problem may be further exacerbated when several users share the use of the high definition audio and/or video play back device and each user may not physically place the remote control in a prominent location for each other to use. Consequently, it may be difficult for the consumers or users to locate the remote control. Accordingly, it would be desirable to provide improved techniques for providing a mobile device based control device locator.

SUMMARY

Provided herein are system, apparatus, article of manufacture, method and/or computer program product embodiments, and/or combinations and sub-combinations thereof, for providing a mobile device based control device locator.

An embodiment includes a computer implemented method for a mobile device based control device locator. The method may operate by receiving a request to locate a control device; transmitting acoustic token transmission information to the control device to activate an electroacoustic transducer on the control device; receiving an acoustic signal including an acoustic token signal from the control device via a plurality of acoustic sensors operatively coupled to the at least one processor; and determining distance information of the control device based on the received acoustic token signal generated by the electroacoustic transducer of the control device.

Another embodiment includes a system for mobile device based control device locator. The system may include at least one processor and a memory coupled to the at least one processor and configured to receive a request input to locate a control device, transmit acoustic token transmission information to the control device to activate an electroacoustic transducer on the control device, receive an acoustic signal including an acoustic token signal from the control device via a plurality of acoustic sensors, and determine distance information of the control device based on the received acoustic token signal generated by the electroacoustic transducer of the control device.

A further embodiment includes a tangible computer-readable device having instructions stored thereon that, when executed by at least one computing device, causes the at least one computing device to perform operations. The operations may include receiving a request to determine distance information and direction information; transmitting acoustic token transmission information to a mobile device to activate an electroacoustic transducer on the control device; receiving an acoustic signal including an acoustic token signal from the mobile device via a plurality of acoustic sensors; and determining the distance information of the mobile device based on the received acoustic token signal generated by the electroacoustic transducer of the mobile device.

BRIEF DESCRIPTION OF THE FIGURES

The accompanying drawings are incorporated herein and form a part of the specification.

FIGS. 4A-B illustrate control device location initiation user interface (UI) view and control device location UI view according to example embodiments.

Figure 1:
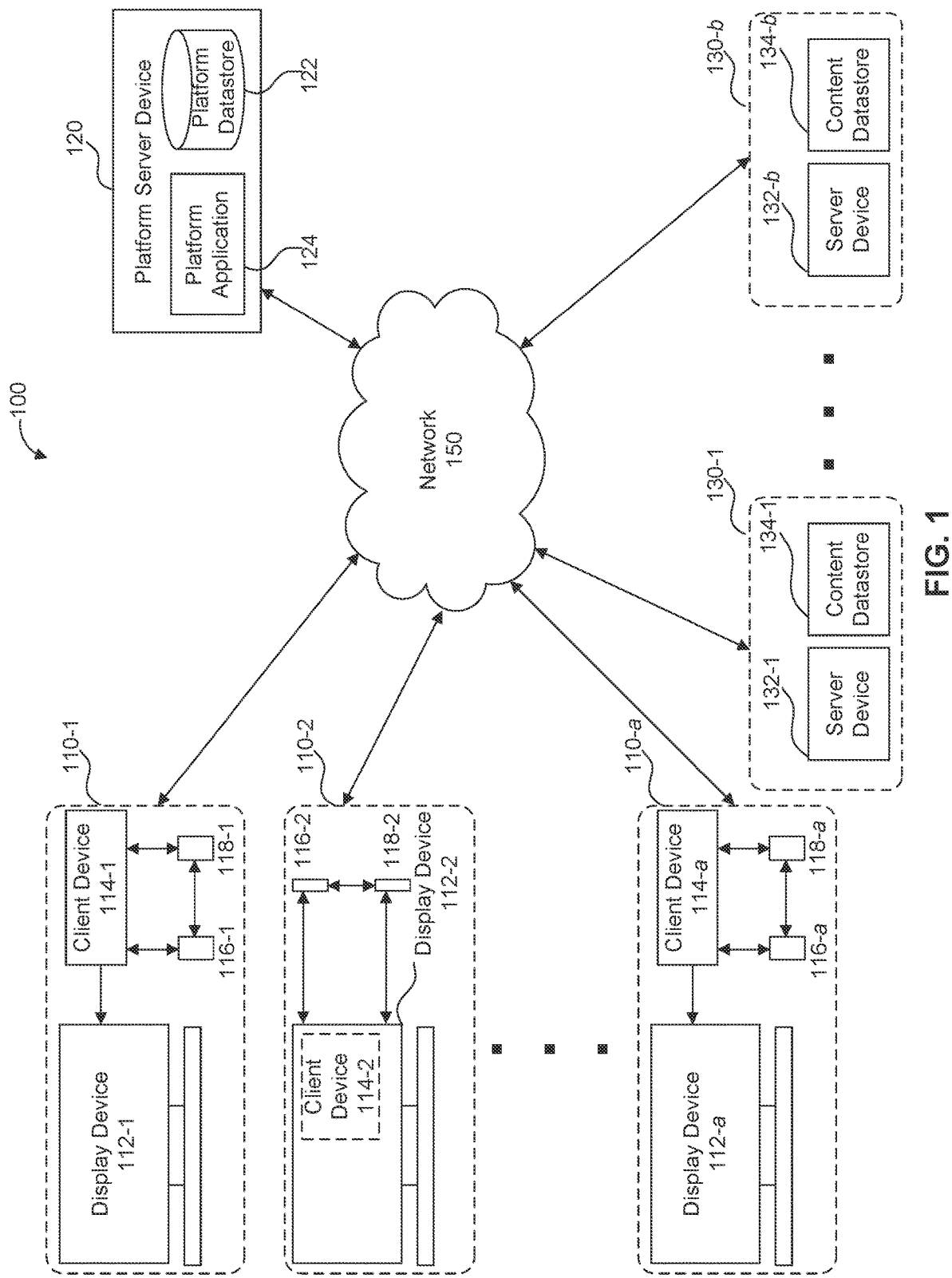
FIG. 1 illustrates a block diagram of a control device location system configured according to an example embodiment.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "a" and "b" and "c" and other similar designators are intended to be variables representing any positive integer. Thus, for example, if an implementation sets a value for a=4, then a complete set of elements 104-*a* may include elements 114-1, 114-2, 114-3, and 114-4.

DETAILED DESCRIPTION

FIG. 1 illustrates a block diagram according to an embodiment of a control device location system 100. In particular, the control device location system 100 may include one or more interface systems 110-*a*, a platform server device 120, and one or more content source systems 130-*b*. In an embodiment, the interface systems 110-*a* may include, without limitation, a display devices 112-*a* (e.g. a monitor, television, a projector, etc.), a media devices 114-*a* (e.g. streaming devices, multimedia devices, audio/video playback devices, etc.), control devices 116-*a*, and/or mobile devices 118-*a*.

In an embodiment, the media devices 114-*a* may be integrated with, operatively coupled to, and/or connected to their respective display devices 112-*a*, control device 116-*a*, and/or network 150. The media devices 150 may be configured to communicate with their respective display devices 112-*a* and network 150. In various embodiments, the network 150 may include, without limitation, a computer and/or telecommunications network which may enable coupled and/or interconnected systems and/or devices to communicate information between and among each other. In various embodiments, the network 150 may include, without limitation, intranet, extranet, Internet, and/or any other local, regional, global telecommunications network.

In an embodiment, the platform server device 120 may include, without limitation, a platform datastore 122 and a platform application 124. The platform datastore 122 may be configured to store platform information which may include, without limitation, network locations and content descriptions of content source systems 130-*b*, hardware/software capabilities of different firmware versions and specifications of the media devices 114-*a*, customer information associated with each media devices 114-*a*, and user interface (UI) information associated with the media devices 114-*a*. The stored customer information may include, without limitation, demographic information, geographic information, internet service provider (ISP) identification information, financial information, and/or any other information that may be associated with customers or users of the media devices 114-*a*. In an embodiment, platform server device 120 may enable access to the content stored in the one or more content source systems 130-*b*.

In an embodiment, the platform server device 120 may generate customized UI information for one or more of the media devices 114-*a*. The generated customized UI information may include content such as, for example, audio, visual, and/or gaming content for selection by the consumers or users of the one or more media devices 114-*a* utilizing, for example, respective control devices 116-*a* and/or mobile devices 118-*a*. The platform server device 120 may be further configured to provide the generated UI information to respective media devices 114-*a* for graphical and/or aural presentation via the respective display devices 114-*a* and/or mobile devices 118-*a*, which may enable a consumers or users to select and/or access content from the content source systems 130-*b*.

In an embodiment, the platform server device 120 may be configured to receive command information from media devices 114-*a* and may process the command information through the platform server application 124. The command information received from the media devices 114-*a* may include, without limitation, navigation commands and/or selection commands which may represent selection of content, search for content, and/or an ongoing interaction with an application executing on the platform server device 120. In an embodiment, the media devices 114-*a* may be configured to acoustically, graphically, and/or visually present user interfaces and/or content on respective display devices 112-*a*. For example, the media device 114-1 may be configured to acoustically, graphically, and/or visually present content on the display device 112-1 sourced from media device 114-1, the platform server device 120, the one or more content source systems 130-*b*, or any combination thereof.

Additionally or alternatively, the media device 114-1 may be configured to provide the one or more user interface (UI) views and/or UI elements and associated acoustic information to display device 112-1 for acoustical, graphical, and/or visual presentation, where the UI views, UI elements, and/or associated acoustic information may be generated by the platform server device 120, the one or more content source systems 130-*b*, or the media device 114-1.

In an embodiment, the control devices 116-*a* may be configured to communicate user input information with the respective media devices 114-*a* and may optionally include a touch screen display (not shown), audio input and/or output circuitry. For example, the control device 116-1 may be configured to utilize one or more wireless communication protocols and/or standards, which may include, without limitation, infrared (IR) protocols and/or standards, radio frequency (RF) protocols and/or standards, and/or Bluetooth protocol and/or standard to communicate with the media device 114-1 and/or mobile device 118-1. In an embodiment, the control device 116-1 may be further configured to enable a consumer or user of media device 114-*a* to navigate and/or make user selections from the UI views presented on the display device 112-1.

Additionally or alternatively, the control device 116-1 itself may be configured to present at least a portion of the UI views on a touch screen display (not shown) connected and/or integrated with the control device 116-1 to enable a consumer or user of media device 114-1 to navigate, select, or otherwise interact with various content as previously discussed. Examples of control devices 116-*a* may include, without limitation, remote controls.

In an embodiment, the mobile devices 118-*a* may also be configured to communicate user input information with respective media devices 114-*a*. For example, the mobile device 118-1 may be configured to utilize the one or more wireless communication protocols and/or standards and include a touch screen display as discussed with respect to control devices 116-*a* to enable the consumer or user of the media device 114-1 to navigate and/or make user selections from the UI views presented on the display device 112-1 and/or the touch screen display integrated with and/or connected to the mobile device 118-1. Examples of mobile devices 118-*a* may include, without limitation, mobile phones, smart phones, tablets, and/or mobile computers.

In an embodiment, the content source systems 130-*b* may include content server devices 132-*b* and associated content datastore 134-*b*. In one embodiment, the network address and/or path of particular content stored within the content datastores 134-*b* may be maintained within the platform server device 120. In another embodiment, the network location of the content source systems 130-*b* is maintained and stored within the platform server device 120 while the specific locations of corresponding content are managed locally by the content source systems 130-*b*. In yet another embodiment, the network location and/or path of the content source systems 130 is embedded within the UI elements representative of selectable and/or viewable content displayed via the media devices 114-*a* and/or display devices 112-*a*, such that interaction with the UI elements through the media devices 114-*a* allows the selectable and/or viewable content located within the content source systems 130-*b* to be accessible to the media devices 114-*a*.

In an embodiment, the content stored within the content datastores 134-*b* may include music, video, multimedia, still pictures, text, graphics, gaming applications, and the like. In another embodiment, the particular content which is stored within the content datastores 134-*b* may be requested and provided to the media devices 114-*a* through the network 150.

By way of example, the media device 114-1 may communicate with platform server device 120 to request specific content for acoustic, graphic, and/or visual presentation on display device 112-1. If the requested content is audio/video content, the platform server device 120 may request the specific content from the one or more respective content source systems 130-b (e.g., content source system 130-1, etc.) via network 150, receive at least a portion of the specific content, and transmit or stream the at least a portion of the specific content to the media device 114-1 via network 150.

In addition to or alternative to the above example, the platform server device 120 may provide one or more network addresses and/or paths of the respective content source systems 130-b (e.g., content source system 130-1, etc.) to the media device 114-1, and the media device 114-1 may subsequently directly request the specific content from the one or more respective content source systems 130-b (e.g., content source system 130-1, etc.), and receive at least a portion of the specific content transmitted or streamed by the one or more respective content source systems 130-b to the media device 114-1 via network 150 for acoustic, graphic, and/or visual presentation on display device 112-1.

Figure 2:
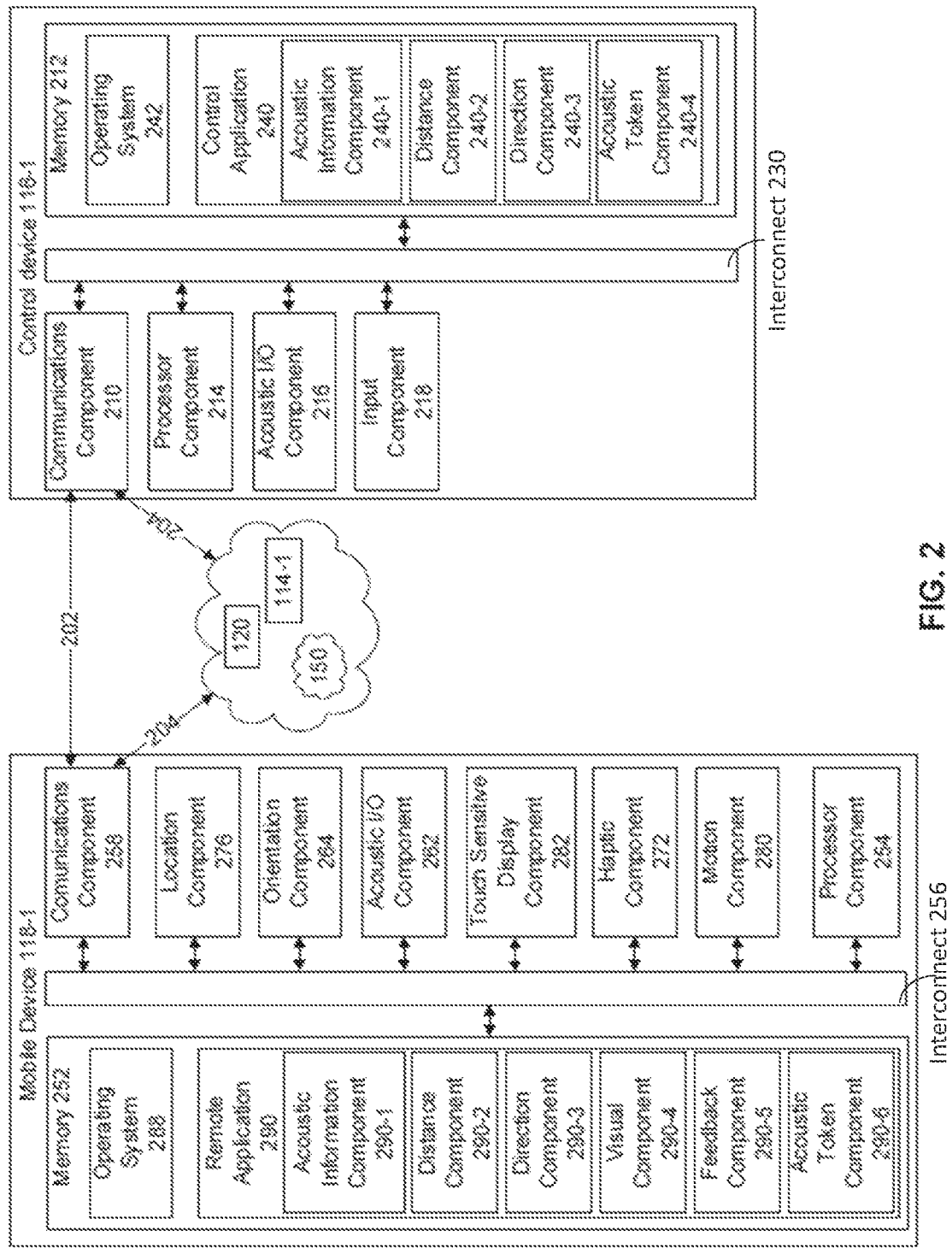
FIG. 2 illustrates components of a mobile device and control device according to an example embodiment.

FIG. 2 illustrates a block diagram of an embodiment of the mobile device 118-1 and the control device 116-1 communicatively coupled to each other via respective communication component 258 and communication component 210.

In an embodiment, the mobile device 118-1 may be generally arranged to provide mobile computing and/or mobile communications and may include, but is not limited to, memory 252, processor component 254, communications component 258, acoustic input/output component 262, touch sensitive display component 282, haptic component 272, location component 276, motion component 280, and orientation component 264, where each of the components and memory 252 may be operatively connected via interconnect 256.

In an embodiment, the processor component 254 may be generally arranged to execute instruction information including one or more instructions. In an embodiment, the processor component 254 may be a mobile processor component or system-on-chip (SoC) processor component which may comprise, among other elements, processor circuit, which may include, but is not limited to, at least one set of electronic circuits arranged to execute one or more instructions. Examples of processor components 254 may include, but is not limited to, QUALCOMM® SNAPDRAGON®, NVIDIA® TEGRA®, INTEL® ATOM®, SAMSUNG® EXYNOS®, APPLE® A7®, APPLE® A8®, or any other type of mobile processor(s) arranged to execute the instruction information including the one or more instructions stored in memory 252.

In an embodiment, the memory 252 may be generally arranged to store information in volatile and/or nonvolatile memory, which may include, but is not limited to, read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM) flash memory, polymer memory such as ferroelectric polymer memory, ovonic memory, phase change or ferroelectric memory, silicon-oxide-nitride-oxide-silicon (SONOS) memory, solid state memory devices (e.g., USB memory, solid state drives SSD, etc.), and/or any other type of storage media configured for storing information.

In an embodiment, the communications component 258 may be generally arranged to enable the mobile device 118-1 to communicate, directly and/or indirectly, with control device 116-1, media device 114-1, platform server device 120, and/or content source systems 130-b. The communications component 258 may include, among other elements, a radio frequency circuit 160 configured for encoding and/or decoding information and receiving and/or transmitting the encoded information as radio signals in frequencies consistent with the one or more wireless communications standards (e.g., Wireless IEEE 802.11, WiMAX IEEE 802.16, Global Systems for Mobile Communications (GSM), Enhanced Data Rates for GSM Evolution (EDGE), Long Term Evolution (LTE), Bluetooth standards, Near Field Communications (NFC) standards, etc.).

In an embodiment, the acoustic input/output (I/O) component 262 may be generally arranged for converting sound, vibrations, or any other mechanical waves received by the mobile device 118-1 into digital or electronic signals representative of acoustic input information utilizing one or more acoustic sensors 262-1-c (e.g., microphones, etc.), which may be located or positioned on or within the housing, case, or enclosure of the mobile device 118-1 to form an microphone array. The acoustic input/output (I/O) component 262 may be configured to provide acoustic input information for each of the one or more acoustic sensors 262-1-c. Additionally, the acoustic I/O component 262 may be further arranged to receive acoustic output information and convert the received acoustic output information into electronic signals to output sound, vibrations, or any other mechanical waves utilizing the one or more electroacoustic transducers 262-2-c (e.g., speakers, etc.).

In an embodiment, the touch sensitive display component 282 may be generally arranged to receive and present visual display information, and provide touch input information based on detected touch based or contact based input. Moreover, the touch sensitive display component 282 may include, among other elements, display device (e.g., liquid-crystal display, light-emitting diode display, organic light-emitting diode display, etc.) for presenting the visual display information and touch sensor(s) (e.g., resistive touch sensor, capacitive touch sensor, etc.) associated with the display device 268 to detect and/or receive touch or contact based input information via associated with the display device 268. Additionally, the touch sensor(s) may be integrated with the surface of the display device, so that a user's touch or contact input may substantially correspond to the presented visual display information on the display device.

In an embodiment, the haptic component 272 may be generally arranged to provide tactile feedback with varying strength and/or frequency with respect to time through the housing, case, or enclosure of the mobile device 118-1. Moreover, the haptic component 272 may include, among other elements, a vibration circuit (e.g., an oscillating motor, vibrating motor, etc.) arranged to receive haptic output information and convert the received haptic output information to mechanical vibrations representative of tactile feedback.

In an embodiment, the location component 276 may be generally arranged to receive positioning signals representative of positioning information and provide location information (e.g., approximate physical location of the current mobile device 118-1) determined based at least partially on the received positioning information. Moreover, the location component 276 may include, among other elements, positioning circuit (e.g., a global positioning system (GPS) receiver, etc.) arranged to determine the physical location of the mobile device 118-1. In some embodiments, the location component 276 may be further arranged to communicate and/or interface with the communications component 258 in order to provide greater accuracy and/or faster determination of the location information.

In an embodiment, the motion component 280 may be generally arranged to detect motion of the mobile device 118-1 in one or more axes. The motion component 280 may include, among other elements, motion sensor (e.g., accelerometer, etc.) to convert physical motions applied to or exerted on the mobile device 118-1 into motion information.

In an embodiment, the orientation component 264 may be generally arranged to detect magnetic fields for measuring the strength of magnetic fields surrounding the mobile device 118-1. The orientation component 264 may include, among other elements, magnetic sensor (e.g., magnetometer, magnetoresistive permalloy sensor, etc.) to convert magnetic field applied to or exerted on the mobile device 118-1 into orientation information.

In an embodiment, the memory may include instruction information arranged for execution by the processor component 254. In that embodiment, the instruction information may be representative of at least one operating system 288, one or more applications, which may include, but is not limited to, remote application 290.

In an embodiment, the operating system 288 may include, without limitation, mobile operating systems (e.g., APPLE®, IOS®, GOOGLE® ANDROID®, HP® WEBOS®, MICROSOFT® WINDOWS PHONE®, MICROSOFT® WINDOWS®, etc.) general arranged to manage hardware resources (e.g., one or more components of the mobile device 118-1) and/or software resources (e.g., one or more applications of the mobile device 118-1).

In an embodiment the remote application 290 may be generally arranged to provide user input information to the media device 114-1 based on received touch input information and assisting a user of the control device 116-1 in determining the approximate physical location of the control device 116-1. The remote application 290 may include, without limitation, an acoustic information component 290-1, a distance component 290-2, a direction component 290-3, a visual component 290-4, a feedback component 290-5, and/or an acoustic token component 290-6.

In an embodiment, the remote application 290 may be configured to request to establish a direct connection 202 with the control device 116-1, in response to receiving touch input information from the touch sensitive display component 282 indicating a request by the user to initiate the location of the control device 116-1. For example, the remote application 290 may be configured to request to establish a direct wireless connection utilizing one or more Bluetooth standards, Wi-Fi standards (e.g., Wi-Fi Direct, Wi-Fi Peer-to Peer (P2P), etc.), and/or NFC standards, where no intermediary devices (e.g., media device 114-1, platform server device 120, network devices (access points, routers, etc.), network 150, etc.) are present in the connection between the mobile device 118-1 and the control device 116-1.

Alternatively, the remote application 290 may also be configured to request to establish an indirect connection 204 with the control device 116-1, in response to receiving touch input information to initiate the location of the control device 116-1. For example, the remote application 290 may be configured to establish an indirect wireless connection utilizing one or more wireless communication standards (e.g., cellular standards, Wi-Fi standards, etc.), where at least one intermediary device (e.g., media device 114-1, platform server device 120, network devices (access points, routers, etc.), network 150, etc.) is present in the connection between mobile device 118-1 and control device 116-1.

After establishing a direct or indirect connection with control device 116-1, the remote application 290 may be configured to operate in at least a first mode and/or a second mode. During the first mode, the remote application 290 may be configured to request the acoustic information component 290-1, distance component 290-2, and/or the direction component 290-3 to begin determining network and computation delay information, acoustic delay information, distance information, and/or control device direction information, in response to receiving touch input information to initiate the location of the control device 116-1.

In an embodiment and during the first mode, the acoustic token component 290-6 may be configured to generate and/or provide acoustic token transmission information in response to a request for acoustic token transmission information. The acoustic token transmission information may include, without limitation, waveform information (e.g., square wave, sinusoidal wave, saw tooth wave, etc.), frequency information (e.g., 10 kHz, 15 kHz, etc.), phase shift information (e.g., 0 degrees, 45 degrees, 90 degrees, etc.), power information (e.g., 500 mW, 1 W, 5 W, 10 W, etc.), duration information (e.g., 250 ms, 500 ms, 1 second, etc.), or any combination thereof.

In an embodiment and during the first mode, the acoustic information component 290-1 may be configured to determine various approximate delays between the control device 116-1 and the mobile device 118-1, in response to a request from the remote application 290 to determine network and computation delay information and acoustic delay information. To determine the various approximate delays between the mobile device 118-1 and the control device 116-1, in an embodiment, the acoustic information component 290-1 may be configured to determine network and computation delay information and acoustic delay information for at least one acoustic sensor of the acoustic I/O component 262.

To determine the network and computation delay information and acoustic delay information during the first mode, in an embodiment, the acoustic information component 290-1 may be configured to request an acoustic token component 290-6 to generate acoustic token transmission information. The acoustic information component 290-1 may be further configured to transmit the generated acoustic token transmission information to the control device 116-1 via the established indirect or direct wireless connection, receive acknowledgement information from the control device 116-1 via the established indirect or direct wireless connection.

By way of example, the acoustic token component 290-6 may generate and/or provide acoustic token transmission information to the acoustic information component 290-1, which may include, without limitation, waveform information (e.g., sinusoidal wave), frequency information (e.g., 10 kHz), phase shift information (e.g., 0 degrees), power information (e.g., 2 W), and/or duration information (e.g., 1 second). The acoustic information component 290-1 may then transmit, via the established direct or indirect network connection, the generated acoustic token transmission information to the acoustic information component 240-1 of the control device 116-1 in order for the control device 116-1 to generate, for example, a 10 kHz sinusoidal acoustic tone with 0 degree phase, at 2 watts for 1 second. In response, the acoustic information component 290-1 may receive control device acknowledgement information from the control device 116-1 via the same established direct or indirect network connection.

Substantially simultaneous or contemporaneous (e.g., within 100 microseconds, 10 microseconds, 1 microsecond, etc.) to the transmission of the acoustic token transmission information during the first mode, the acoustic information component 290-1 may also be configured to reset and initiate a high resolution timer (e.g., within 1 microsecond resolution, 100 nanoseconds resolution, etc.). Upon receiving the control device acknowledgement information from the control device 116-1 via the direct or indirect wireless connection during the first mode, the acoustic information component 290-1 may store a value of the high resolution timer in memory 252. The stored value may be the round trip network and computation delay, where half of the stored value may be an estimate of one way network and computation delay and may be represented as the network and computation delay information. It may be appreciated that the network and computation delay information may be indicative of the aggregate time required for the control device 116-1 to: (1) receive the acoustic token transmission information, (2) process the acoustic token transmission information, (3) generate an acoustic token signal based on the acoustic token transmission information, and (4) start or begin the emission of the acoustic token signal by the control device 116-1 via the acoustic I/O component 216.

Substantially simultaneous or contemporaneous to the transmission of the generated acoustic token transmission information (e.g., within 100 nanoseconds, etc.) or a short period of time before the transmission of the generated acoustic token transmission information (e.g., 500 milliseconds before, etc.) during the first mode, the acoustic information component 290-1 may also be configured to continuously receive acoustic signals from the environment as acoustic input information for one or more acoustic sensors 262-1-c of the acoustic I/O component 262, where the acoustic signals may include, among other acoustic signals, the acoustic token signal generated and emitted by the control device 116-1. It may be appreciated the acoustic information component 290-1 may buffer or store at least a portion of the acoustic signal (e.g., 250 milliseconds, 500 milliseconds, etc.) and corresponding values of the high resolution timer as acoustic sensor information in memory 252 for one or more acoustic sensors 262-1-c utilizing the acoustic I/O component 262.

Upon buffering or storing the acoustic sensor information including the acoustic token signal generated in accordance with the acoustic token transmission information for one or more acoustic sensors 262-1-c during the first mode, the acoustic information component 290-1 may detect and determine the time of when the acoustic token signal was first received by, for example, correlating and comparing the acoustic sensor information with the generated acoustic token transmission information, and determining the time based on the corresponding values of the high resolution timer. For each of the one or more acoustic sensors 262-1-c, a value associated with the high resolution timer may be stored based on the detection and determination of the time of when the acoustic token signal was first received by the mobile device 118-1. It may be appreciated that due to physical arrangement of one or more acoustic sensors 262-1-c in the mobile device 118-1 and the actual location of the control device 116-1 emitting the acoustic token signal, some of the acoustic sensors of the one or more acoustic sensors 262-1-c may receive the acoustic token signal at a different time than others acoustic sensors. Thus, each value may be indicative of the time when the acoustic token signal was first received by a particular acoustic sensor of one or more acoustic sensors 262-1-c, which may be represented as aggregate acoustic delay information.

In an embodiment and during the first mode, the acoustic information component 290-1 may be further configured to determine the acoustic delay information for each of the one or more acoustic sensors 262-1-c, based on the difference between the aggregate acoustic delay information for each of the one or more acoustic sensors 262-1-c and the network and computation delay information. In an embodiment and during the first mode, the acoustic information component 290-1 may be configured to determine sound speed information representative of the speed of sound based on one or more environmental factors. The one or more environmental factors may include a temperature, a pressure (e.g., altitude, etc.), humidity, or any combination thereof near the proximity of the mobile device 118-1. It may be appreciated the environmental factors may be determined by the mobile device 118-1 by interfacing with readily available online weather datastores based on location information provided by the location component 276 of the mobile device 118-1.

In an embodiment and during the first mode, based on the acoustic delay information for at least one acoustic sensor of the one or more acoustic sensors 262-1-c, and the sound speed information, the distance component 290-2 may be configured to calculate an approximate distance between the mobile device 118-1 and the control device 116-1, which may be represented by distance information. Additionally or alternatively, based on an average of the acoustic delay information for a plurality of acoustic sensors 262-1-c, and the sound speed information, the distance component 290-2 may be configured to calculate an approximate distance between the mobile device 118-1 and the control device 116-1, which may also be represented by the distance information.

In addition to or alternative to the determination of distance between the mobile device 118-1 and the control device 116-1, in an embodiment and during the first mode, the direction component 290-3 may be configured to determine direction information by comparing acoustic delay information between at least two acoustic sensors 262-1-c to determine paired acoustic delay information. Additionally or alternatively, the direction component 290-3 may be configured to utilize time delay estimation techniques to determine paired acoustic delay information.

By way of example, the direction component 290-3 may be configured to compare the stored acoustic signal information for pairs of acoustic sensors 262-1-c to determine paired acoustic delay information utilizing one or more time delay estimation algorithms, which may include, without limitation, cross correlation algorithm, generalized cross correlation algorithm (GCC), phase transform algorithm (PHAT), and the like. It may be appreciated that the one or more time delay estimation algorithms may be further configured to determine paired acoustic delay information utilizing substantially the acoustic token signal for acoustic signal information of each acoustic sensor.

In an embodiment and during the first mode, the direction component 290-3 may be further configured with acoustic sensor arrangement information representative of one or more algorithms for determining control device direction information and physical distances and angles between the acoustic sensors 262-1-c. For example, the direction component 290-3 may be configured to determine the control device direction information based on the acoustic sensor arrangement information, the sound speed information, and one or more paired time delay information.

It may be appreciated that at least one technical advantage that may be realized in using a specific acoustic token signal generated in accordance with acoustic token transmission information, is that the determination of distance information and control device direction information is possible even in noisy environments. Additionally, by having the control device 116-1 emit a distinct acoustic token signal, a user may also easily identify and locate the control device 116-1 based on hearing in conjunction with the information displayed in the control device location UI view 450 on a mobile device 118-1.

As previously discussed above, in addition to the first mode, the remote application 290 may also operate in the second mode, which may be in addition to or alternative to the first mode. During the second mode, the remote application 290 may be configured to request the control device 116-1 to determine network and computation delay information, acoustic delay information, distance information, and/or mobile device direction information, in response to receiving touch input information to initiate the location of the control device 116-1.

In an embodiment and during the second mode, the acoustic token component 290-6 may be configured to receive acoustic token transmission information from the control device 116-1. In response to receiving acoustic token transmission information from the control device 116-1, the acoustic token component 290-6 may provide acoustic output information to the acoustic I/O component 262 in order to generate an acoustic token signal in accordance with the received acoustic token transmission information. Thus, the acoustic output information may be generated by the acoustic token component 290-6 based on the received acoustic token transmission information. Substantially simultaneous or contemporaneous (e.g., within 100 microseconds, 10 microseconds, etc.) to the providing of the acoustic output information to the acoustic I/O component 262 during the second mode, the acoustic token component 290-6 may also be configured to provide mobile device acknowledgement information via the established direct and/or indirect wireless connection to the control device 116-1.

In an embodiment and during the second mode, the remote application 290 may be configured to receive the network and computation delay information, acoustic delay information, distance information, and/or control device direction information from the control device 116-1, which may be subsequently utilized by the visual component 290-4 for visual presentation and/or feedback component 290-5 for providing haptic and/or auditory feedback. Additionally or alternatively, the remote application 290 may also be configured to translate the received mobile device direction information, generated from the perspective of the control device 116-1 to control device direction information by, for example, shifting the received mobile device direction information by 180 degrees.

In an embodiment, the visual component 290-4 may be configured to visually present one or more UI views including one or more UI elements to enable a user to initiate in the determination of the physical location of a lost control device 116-1. For example, the visual component 290-4 may be configured to visually present control device location initiation UI view 400 of FIG. 4A on the display device of the touch sensitive display component 282 and receive touch input information from the touch sensitive display component 282 to initiate the location of the control device 116-1.

Additionally or alternatively, the visual component 290-4 may also be configured to visually present and update, in substantially real-time control device location UI view 450.

For example, the visual component 290-4 may be configured to visually present, in substantially real-time, one or more UI elements of the control device location UI view 450 based on location information received from location component 276, the motion information received from acceleration component 280, orientation information from the orientation component 264, distance information generated by the distance component 290-2 or distance component 240-2, and/or control device direction information generated by the direction component 290-3 or translated from mobile device direction information generated by direction component 240-3.

In an embodiment, the feedback component 290-5, may be configured to provide auditory and/or haptic feedback to the user. In an embodiment, the feedback component 290-5 may be configured to generate feedback information based on the distance information and/or direction information. The feedback information may include, without limitation, pulse waveform information (e.g., square wave, sinusoidal wave, saw tooth wave, etc.), pulse frequency information (e.g., 5 kHz, 10 kHz, 15 kHz for each pulse, etc.), pulse power information (e.g., 500 mW, 1 W, 5 W, 10 W, etc.), pulse duration information (e.g., 250 ms, 500 ms, 1 second duration for each pulse etc.), and/or pulse gap information (e.g., 500 ms, 1 second, 2 seconds gap between each pulse, etc.).

In an embodiment, the feedback component 290-5 may generate pulse frequency information of the feedback information as a function of control device direction information, where the generated pulse frequency information may be higher (e.g., 8 kHz), when the direction information indicates that the approximate location of the acoustic token signal and accordingly the control device 116-1 may be directly in front of the mobile device 118-1. Similarly, the frequency may be lower (e.g., 2 kHz), when the control device direction information indicates that the approximate location of the acoustic token signal and accordingly the control device 116-1 may be directly behind of the mobile device 118-1.

Additionally or alternatively, the feedback component 290-5 may generate the pulse gap information and/or the pulse duration information as a function of distance information, where the generated pulse gap information may be longer (e.g., every 2 second) and pulse duration information may be shorter (e.g., 500 ms), when the distance information indicates that the approximate location of the acoustic token signal and accordingly the control device 116-1 is further away from the mobile device 118-1. Similarly, the pulse gap information may be shorter (e.g., every 250 ms) and pulse duration information may be longer (e.g., 1 second), when the distance information indicates that the location of the acoustic token signal and accordingly the control device 116-1 may be very close to the mobile device 118-1.

In an embodiment, the feedback component 290-5 may be configured to convert the generated feedback information to acoustic output information and/or haptic output information, and provide the acoustic output information and/or the haptic output information to the acoustic I/O component 262 and/or haptic component 272, respectively, in order to emit sound and/or mechanical vibrations in accordance with the generated feedback information.

In a non-limiting example, when the mobile device 118-1 determines that a control device 116-1 is directly in front and is also very close to the mobile device 118-1, the mobile device 118-1 may emit sound with a sinusoidal wave having a frequency of the 8 kHz for duration of 1 second, and repeating after 250 ms have elapsed. Additionally or alternatively, mobile device 118-1 may also emit mechanical vibrations with a sinusoidal wave having a frequency of the 8 kHz for duration of 1 second, and repeating after 250 ms have elapsed.

In another non-limiting example, when the mobile device 118-1 determines that the control device 116-1 is behind and distant to the mobile device 118-1, the mobile device 118-1 may emit sound with a sinusoidal wave having a frequency of the 2 kHz for duration of 500 ms, and repeating after 2 seconds have elapsed. Additionally or alternatively, mobile device 118-1 may also emit mechanical vibrations with a sinusoidal wave having a frequency of 2 kHz for duration of 500 ms, and repeating after 2 seconds have elapsed.

In an embodiment, the control device 116-1 may be generally arranged to communicate user input information to, for example, the media device 114-1 and may include, but is not limited to, memory 212, processor component 214, communications component 210, acoustic input/output component 216, input component 218, where each of the components and memory 212 may be operatively connected via interconnect 230.

In an embodiment, the processor component 214 may be generally arranged to execute instruction information including one or more instructions. In an embodiment, the processor component 214 may be an embedded processor component or system-on-chip (SoC) processor component which may comprise, among other elements, processor circuit, which may include, but is not limited to, at least one set of electronic circuits arranged to execute one or more instructions. Examples of processor components 214 may include, but is not limited to, QUALCOMM® SNAPDRAGON®, TEXAS INSTRUMENTS® OMAP®, or any other type of embedded processor(s) and/or mobile processor(s) arranged to execute the instruction information including the one or more instructions stored in memory 212.

In an embodiment, the memory 212 may be generally arranged to store information in volatile and/or nonvolatile memory, which may include, but is not limited to, one or more example memories discussed above with respect to memory 252 of mobile device 118-1.

In an embodiment, the communications component 210 may be generally arranged to enable the control device 116-1 to communicate, directly and/or indirectly, with media device 114-1, mobile device 118-1, platform server device 120, and/or content source systems 130-*b*. The communications component 210 may include, among other elements, radio frequency circuit(s) configured for encoding and/or decoding information and receiving and/or transmitting the encoded information as radio signals in frequencies consistent with the one or more wireless communications standards (e.g., Wireless IEEE 802.11, Bluetooth standards, Near Field Communications (NFC) standards, etc.). Additionally, the communications component 210 may further include, among other elements, infrared emitter circuit(s) to communicate directly and/or indirectly with previously discussed devices and systems.

In an embodiment, the acoustic I/O component 216 may be generally arranged for converting sound, vibrations, or any other mechanical waves received into digital or electronic signals representative of acoustic input information utilizing one or more acoustic sensors 216-1-*e* (e.g., microphones, etc.), which may be located or positioned on or within the housing, case, or enclosure of the control device 116-1 to form an microphone array. The I/O component 216 may be configured to provide acoustic input information for each of the one or more acoustic sensors 216-1-*e*. Additionally, the acoustic I/O component 216 may be further arranged to receive acoustic output information and convert the received acoustic output information into electronic signals to output sound, vibrations, or any other mechanical waves utilizing the one or more electroacoustic transducers 216-2-*f* (e.g., speakers, etc.).

In an embodiment, the input component 218 may be generally arranged to receive user input(s) via a keypad (not shown) and provide the user input information representative of user inputs to the media device 114-1. For example, the input component 218 may receive user input(s) such as key presses on the keypad, generate user input information based on the key presses, and transmit user input information to the media device 114-1 via communications component 210.

In an embodiment, the memory 212 may include instruction information arranged for execution by the processor component 214. In that embodiment, the instruction information may optionally include, among other instruction information, an embedded operating system 242, and one or more applications, which may include, but is not limited to, control application 240. The optional embedded operating system 242 may include operating systems general arranged to manage hardware resources (e.g., one or more components of the control device 116-1) and/or software resources (e.g., one or more applications of the control device 116-1).

In an embodiment, the control application 240 may be generally arranged to provide input information to the media device 114-1 based on received user input information. The control application 240 may include, without limitation, acoustic information component 240-1, distance component 240-2, direction component 240-2, and/or acoustic token component 240-3. In an embodiment, the control application 240 may be configured to establish a direct or indirect connection with the mobile device 118-1, the control application 240 may be configured to receive a request from the mobile device 118-1 to establish a direct or indirect connection as previously discussed with respect to the mobile device 118-1.

After establishing a direct or indirect connection with the mobile device 118-1, the control application 240 may be configured to operate in at least a first mode corresponding to the first mode of the remote application 290 and/or a second mode corresponding to the second mode of the remote application 290.

During the first mode, the control application 240 and in particular, the acoustic token component 240-4 may be configured to receive acoustic token transmission information from the mobile device 118-1. In response to receiving the acoustic token transmission information from the mobile device 118-1, the acoustic token component 240-3 may provide acoustic output information to the acoustic I/O component 216 in order to generate an acoustic signal in accordance with the received acoustic token transmission information, where the acoustic output information may be generated by the acoustic token component 240-4 based on the received acoustic token transmission information. Substantially simultaneous or contemporaneous (e.g., within 100 microseconds, 10 microseconds, 1 microsecond, etc.) to the providing of acoustic output information to the acoustic I/O component 216, the acoustic token component 240-4 may also be configured to provide control device acknowledgement information via the established direct and/or indirect wireless connection to the mobile device 118-1.

During the second mode, the control application 240 may be configured to receive a request from the mobile device 118-1 to begin the determination of network and computation delay information, acoustic delay information, distance information, and/or mobile device direction information. In an embodiment and during the second mode, the control application 240 may request the acoustic information component 240-1 to determine network and computation delay information and acoustic delay information.

In an embodiment and during the second mode, the acoustic information component 240-1 may be configured to determine various approximate delays between the control device 116-1 and the mobile device 118-1, in response to a request from the control application 240 to determine network and computation delay information and acoustic delay information.

To determine the various approximate delays between mobile device 118-1 and the control device 116-1 during the second mode, in an embodiment, the acoustic information component 290-1 may be configured to determine network and computation delay information and acoustic delay information for at least one acoustic sensor of the acoustic input/output (I/O) component 216.

To determine the network and computation delay information and acoustic delay information during the second mode, in an embodiment, the acoustic information component 240-1 may be configured to request an acoustic token component 240-4 to generate acoustic token transmission information. The acoustic information component 240-1 may be further configured to transmit the generated acoustic token transmission information to the mobile device 118-1 via the established indirect or direct wireless connection, receive mobile device acknowledgement information from the mobile device 118-1 via the established indirect or direct wireless connection.

In an embodiment and during the second mode, the acoustic token component 240-4 may be configured to generate and/or provide acoustic token transmission information in response to a request for acoustic token transmission information. The acoustic token transmission information may contain information similar to those previously discussed with respect to mobile device 118-1.

Substantially simultaneous or contemporaneous (e.g., within 100 microseconds, 10 microseconds, 1 microsecond, etc.) to the transmission of the acoustic token transmission information to the mobile device 118-1 during the second mode, the acoustic information component 240-1 may also be configured to reset and initiate a high resolution timer (e.g., within 1 microsecond resolution, 100 nanoseconds resolution, etc.). Upon receiving the mobile device acknowledgement information from the mobile device 118-1 via the direct or indirect wireless connection during the second mode, the acoustic information component 240-1 may store a value of the high resolution timer in memory 252. The stored value may be representative of the round trip network and computation delay, where half of the stored value may be an estimate of one way network and computation delay and may be represented as the network and computation delay information. It may be appreciated that the network and computation delay information may be indicative of the aggregate time required for the mobile device 118-1 to: (1) receive the acoustic token transmission information, (2) process the acoustic token transmission information, (3) generate an acoustic token signal based on the acoustic token transmission information, and (4) start the transmission of the acoustic token signal by the mobile device 118-1 via the acoustic I/O component 262.

Substantially simultaneous or contemporaneous to the transmission of the generated acoustic token transmission information (e.g., within 100 nanoseconds, etc.) or a short period of time before the transmission of the generated acoustic token transmission information (e.g., 500 millisecond before, etc.), the acoustic information component 240-1 may also be configured to continuously receive and store acoustic signals from the environment as acoustic input information for one or more acoustic sensors 216-1-*e* of the acoustic I/O component 216, where the acoustic signals may include, among other acoustic signals, the acoustic token signal generated and emitted by mobile device 118-1. It may be appreciated the acoustic information component 240-1 may receive and buffer or store at least a portion of the acoustic signals (e.g., 250 milliseconds, 500 milliseconds, etc.) and corresponding values of the high resolution timer as acoustic sensor information in memory 212 for one or more acoustic sensors 216-1-*e* utilizing the acoustic I/O component 216.

Upon buffering or storing the acoustic sensor information including the acoustic token signal generated in accordance with the acoustic token transmission information for one or more acoustic sensors 216-1-*e* during the second mode, the acoustic information component 290-1 may detect and determine the time of when the acoustic token signal was first received by, for example, correlating and comparing the acoustic sensor information with the generated acoustic token transmission information, and determining the time based on the corresponding values of the high resolution timer. For each of the one or more acoustic sensors 216-1-*e*, a value associated with the high resolution timer may be stored based on the detection and determination of the time of when the acoustic token signal was first received by the control device 116-1. It may be appreciated that due to physical arrangement of one or more acoustic sensors 216-1-*e* in the control device 116-1 and the actual location of the mobile device 118-1 emitting the acoustic token signal, some of the acoustic sensors of the one or more acoustic sensors 216-1-*e* may receive the acoustic token signal at a different time than others acoustic sensors. Thus, each value may be indicative of the time when the acoustic token signal was first received by a particular acoustic sensor of one or more acoustic sensors 216-1-*e*, which may be represented as aggregate acoustic delay information.

In an embodiment and during the second mode, the acoustic information component 240-1 may be further configured to determine the acoustic delay information for each of the one or more acoustic sensors 216-1-*e*, based on the difference between the aggregate acoustic delay information for each of the one or more acoustic sensors 216-1-*e* and the network and computation delay information. In an embodiment, the acoustic information component 240-1 may be configured to determine sound speed information representative of the speed of sound based on one or more environmental factors. The one or more environmental factors may include a temperature, a pressure (e.g., altitude, etc.), humidity or any combination thereof near the proximity of the control device 116-1. It may be appreciated the environmental factors may be determined by the control device 116-1 by interfacing with readily available online weather datastores based on geographic information previously discussed for the user of the media device 114-1. Additionally or alternatively, the one or more environmental factors may also be preprogrammed.

In an embodiment and during the second mode, based on the acoustic delay information for at least one acoustic sensor of the one or more acoustic sensors 216-1-*e*, and the sound speed information, the distance component 240-2 may be configured to calculate an approximate distance between the mobile device 118-1 and the control device 116-1, which may be represented as distance information. Additionally or alternatively, the distance component 240-2 may be configured to calculate an approximate distance between the mobile device 118-1 and the control device 116-1 based on an average of the acoustic delay information for a plurality of acoustic sensors 216-1-$e$ and the sound speed information.

In addition to or alternative to the determination of distance between the mobile device 118-1 and the control device 116-1 by the control device 116-1 during the second mode, in an embodiment, the direction component 240-3 may be configured to determine direction information by comparing acoustic delay information between at least two acoustic sensors 216-1-$e$ to determine paired acoustic delay information. Additionally or alternatively, the direction component 240-3 may be configured to utilize time delay estimation techniques for determining paired acoustic delay information as previously discussed with respect to direction component 290-3.

In an embodiment and during the second mode, the direction component 240-3 may be further configured with acoustic sensor arrangement information representative of one or more algorithms for determining direction information and physical distances and angles between the acoustic sensors 216-1-$e$, and determine the mobile device direction information based on the acoustic sensor arrangement information, the sound speed information, and one or more paired acoustic delay information.

After the direction component 240-3 determines the mobile device direction information during the second mode, the control application 240 may be configured to transmit acoustic delay information, distance information, and/or mobile device direction information to the mobile device 118-1 for further processing, visual presentation, and/or acoustic and/or haptic feedback.

Figure 3A:
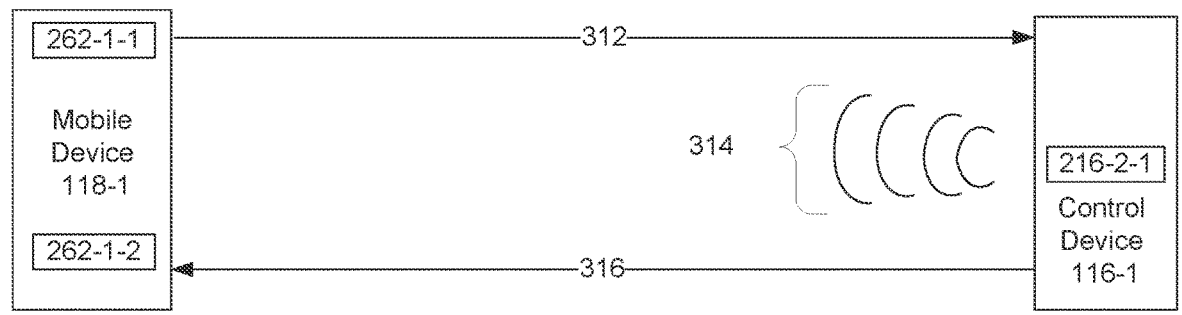
FIGS. 3A-B illustrate interactions between the mobile device and control device according to example embodiments.

FIG. 3A illustrates an embodiment of mobile device 118-1 and control device 116-1 operating in the first mode. In an embodiment illustrated in FIG. 3A, the mobile device 118-1 may include at least two acoustic sensors 262-1-1 and 262-1-2 physically arranged in the top portion of the mobile device 118-1 and bottom portion of the mobile device 118-1, respectively. The mobile device 118-1 may transmit acoustic token transmission information to the control device 116-1 via the established indirect or direct wireless connection as illustrated by element 312. In response, the control device 116-1 may emit acoustic token signal, which may be received by the mobile device 118-1 as illustrated by element 314. The control device 116-1 may also transmit control device acknowledgement information via the established indirect or direct wireless connection, which may be received by the mobile device 118-1 as illustrated by element 316.

Figure 3B:
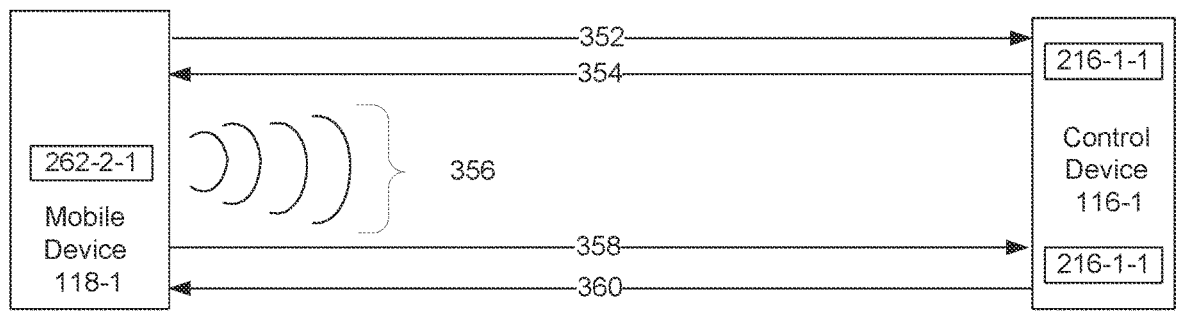

FIG. 3B illustrates an embodiment of mobile device 118-1 and control device 116-1 operating in the second mode. In an embodiment illustrated in FIG. 3B, the control device 116-1 may include at least two acoustic sensors 216-1-1 and 216-1-2 physically arranged in the top portion of the control device 116-1 and bottom portion of the control device 116-1, respectively. The mobile device 118-1 may transmit a request to the control device 116-1 to determine network and computation delay information, mobile device delay information, distance information, and/or mobile device direction information, via the established indirect or direct wireless connection, which may be received by the control device 116-1 as illustrated by element 352. In response, the control device 116-1 may transmit acoustic token transmission information to the mobile device 116-1 via the established indirect or direct wireless connection, which may be received by the mobile device 118-1 as illustrated by element 354. In response, the mobile device 118-1 may emit acoustic token signal, which may be received by the control device 116-1 as illustrated by element 356. The mobile device 118-1 may also transmit mobile device acknowledgement information via the established indirect or direct wireless connection, which may be received by the control device 116-1 as illustrated by element 358. The control device 116-1 may then transmit network and computation delay information, acoustic delay information, distance information, and/or mobile device direction information to the mobile device 118-1, which may be received by the mobile device 118-1 as illustrated by element 360.

FIG. 4A illustrates a control device location initiation UI view 400 for visual presentation on a mobile device 118-1. As illustrated in FIG. 4A, the control device location initiation UI view 400 may include a locate control device UI element 412 and a back UI element 414. A user may select the control device UI element 412, for example, by touching the portion defined by the control device UI element 412 on the display device of the touch sensitive display component 282. This in turn may provide touch input information to the remote application 290 and initiate the process to establish a direct or indirect connection with control device 116-1 and determining network and computation delay information, acoustic delay information, distance information, and/or control device direction information utilizing the first mode and/or second mode. The user may select the back UI element 414, to return to using the remote control functions of the remote application 290.

FIG. 4B illustrates a control device location UI view 450, which may be visually presented on the mobile device 118-1 after user selects the locate control device UI element 412. As illustrated in FIG. 4B, the control device location UI view 450 may include a text based distance UI element 462, a text based direction UI element 464, a graphical distance and direction UI element 474, a mobile device direction UI element 468, a path UI element 472, a approximate location UI element 466, and a back UI element 470. The user may select the back UI element 470, to return to the control device location initiation UI view 400.

In an embodiment, the text based distance UI element 462 may be visually presented and continuously updated in substantially real-time to indicate the current distance between the mobile device 118-1 and control device 116-1 based on the determined distance information. It may be appreciated that the visually presented distance information may vary by font, size, color, units and/or the like.

The text based direction UI element 464 may be visually presented and continuously updated in substantially real-time to indicate the current approximate direction with respect to the orientation of the mobile device 118-1, based on the determined control device direction information. It may be appreciated that the visually presented distance information may vary by font, size, color, and may visually present the general direction such as North (N), South (S), East (E), West (W), or combinations thereof, of the control device 116-1 with respect to the mobile device 118-1. In an embodiment, the mobile device direction UI element 468 may be visually presented and continuously updated in substantially real-time to indicate the current heading of the mobile device 118-1. It may be appreciated that the visually presented current heading, which may be an arrow pointing to the current heading of the mobile device 118-1, may vary by size, color, shape, and/or the like. This heading may be synchronized or locked to the orientation of the mobile device 118-1. Alternatively, the heading may be determined based on orientation information received from the orientation component 264.

In an embodiment, the graphical distance and direction UI element 474 may be visually presented and continuously updated in substantially real-time to indicate the current distance and direction of the control device 116-1 with respect to the current heading of the mobile device 118-1 based on the control device direction information, distance information, and/or orientation information. It may be appreciated that the visually presented current distance and direction of the control device 116-1, which may be an arrow pointing to an approximate location of the control device 116-1, may vary by size, color, shape, and/or the like.

By way of example, the length of the arrow of the distance and direction UI element 474 may be a function of the distance information, so that the farther the control device 116-1 is from the mobile device 118-1, the longer the arrow up to a maximum length. Similarly, the closer the control device 116-1 is from the mobile device 118-1, the shorter the arrow up to a minimum length.

In an embodiment, the arrow of the graphical distance and direction UI element 474 may be visually presented and continuously updated in substantially real-time to pivot with respect to the mobile device direction UI element 468 based on the control device direction information and/or orientation information.

In an embodiment, the path UI element 472 may be visually presented and continuously updated in substantially real-time to indicate the path of travel of the mobile device 118-1 based on the motion information received from motion component 280 and location information received from location component 276. It may be appreciated that the visually presented path may assist users in tracking the location of the control device 116-1 in relation to the approximate physical location(s) or paths the user has already taken to find the control device 116-1 with the mobile device 118-1.

In an embodiment, the approximate location UI element 466 may be visually presented and continuously updated in substantially real-time to indicate the approximate location of the control device 116-1 based on the distance information, control device direction information and orientation information. It may be appreciated that the visually presented approximate location of the control device 116-1, which may be a circle, may vary by size, color, and/or the like.

Provided herein are some of the processing operations that may be performed by one or more example embodiments. Although some of the processing operations may appear to be performed sequentially, it may be appreciated that the processing operations may not be limited to the order as illustrated and/or described. Additionally, some of the processing operations may even occur substantially simultaneously or contemporaneously with respect to other processing operations.

Figure 5A:
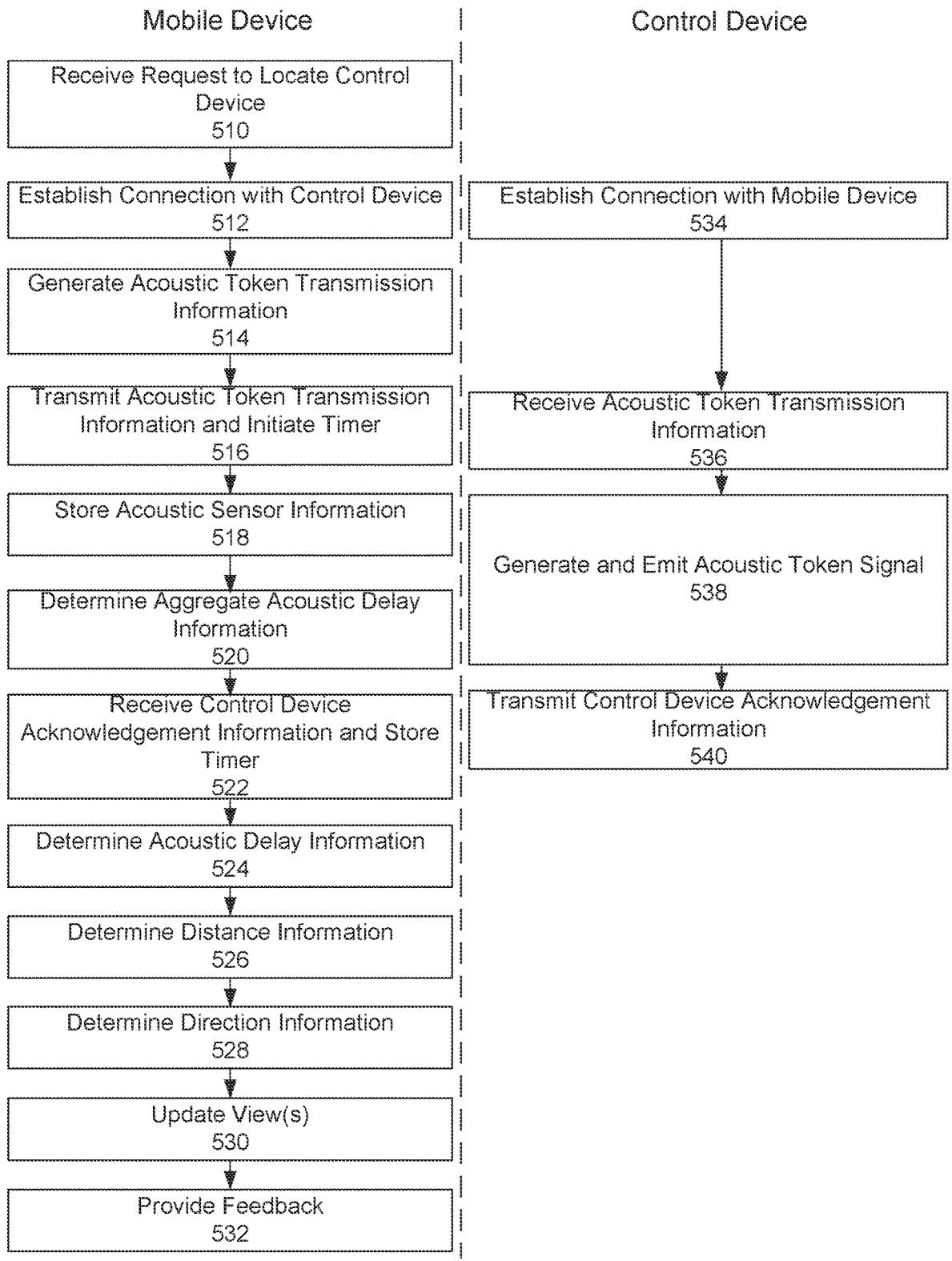
FIGS. 5A-B illustrate processing operations between the mobile device and control device according to example embodiments.

FIG. 5A illustrates processing operations that may be performed by the processor component 254 of a mobile device and processor component 214 of a control device with respect to the first mode.

With respect to a mobile device, at step 510, mobile device may receive request to locate control device. For example, mobile device 118-1 may receive request from user to locate control device 116-1. At step 512, mobile device may establish connection with control device 512. For example, mobile device 118-1 may request to establish a direct or indirect wireless connection with the control device 116-1. At step 514, the mobile device may generate acoustic token transmission information. For example, mobile device 118-1 may generate acoustic token transmission information, which may include, without limitation, waveform information, frequency information, phase shift information, power information, and/or duration information. At step 516, mobile device may transmit acoustic token information and initiate timer. For example, mobile device 118-1 may transmit acoustic token information to the control device 116-1 and substantially contemporaneous or simultaneous to the transmission, the mobile device 118-1 may also initialize or reset a high resolution timer.

At step 518, the mobile device may store acoustic sensor information. For example, mobile device 118-1 may store or buffer at least a portion of acoustic input information received from control device 116-1 via acoustic I/O component 262 and associated values of the high resolution timer as acoustic sensor information for each of the one or more acoustic sensors 262-1-c. At step 520, the mobile device may determine aggregate acoustic delay information. For example, mobile device 118-1 may determine the aggregate acoustic delay information by correlating and comparing the acoustic sensor information with the generated acoustic token transmission information. At step 522, the mobile device may receive control device acknowledgement information and store timer. For example, the mobile device 118-1 may receive control device acknowledgement information transmitted from control device 116-1 and substantially contemporaneous or simultaneous to the receipt, the mobile device 118-1 may store the value of the high resolution timer.

At step 524, mobile device may determine acoustic delay information. For example, the mobile device 118-1 may determine acoustic delay information for each of the one or more acoustic sensors 262-1-c based on the stored value of the high resolution timer and aggregate acoustic delay information for each of the one or more acoustic sensors 262-1-c. At step 526, mobile device may determine distance information. For example, the mobile device 118-1 may determine distance information based at least partially on acoustic delay information for at least one acoustic sensor of the one or more acoustic sensors 262-1-c and/or sound speed information.

At step 526, mobile device may determine direction information. For example, the mobile device 118-1 may determine control device direction information based at least partially on the acoustic sensor arrangement information, the sound speed information, and/or one or more paired time delay information. At step 530, mobile device may update views. For example, mobile device 118-1 may update, in substantially real-time, the control device location UI view 450 and one or more UI elements in the control device location UI view 450. At step 532, mobile device may provide feedback. For example, mobile device 118-1 may provide haptic feedback based at least partially on the distance information and/or direction information.

With respect to a control device, at step 534, the control device may establish connection with mobile device. For example, the control device 116-1 may establish a direct or indirect connection with mobile device 118-1, in response to the request to establish a direct or indirect wireless connection by the mobile device 118-1 at step 512. At step 536, the control device may receive acoustic token transmission information. For example, control device 116-1 may receive acoustic token transmission information transmitted by mobile device 118-1 at step 516. At step 538, the control device may generate acoustic token signal. For example, control device 116-1 may generate and emit acoustic token signal based on the acoustic token transmission information. At step 540, control device may transmit control device acknowledgment information. For example, control device 116-1 may transmit control device acknowledgment information to the mobile device 118-1 substantially contemporaneous or simultaneous to the generation and emission of the acoustic token signal.

Figure 5B:
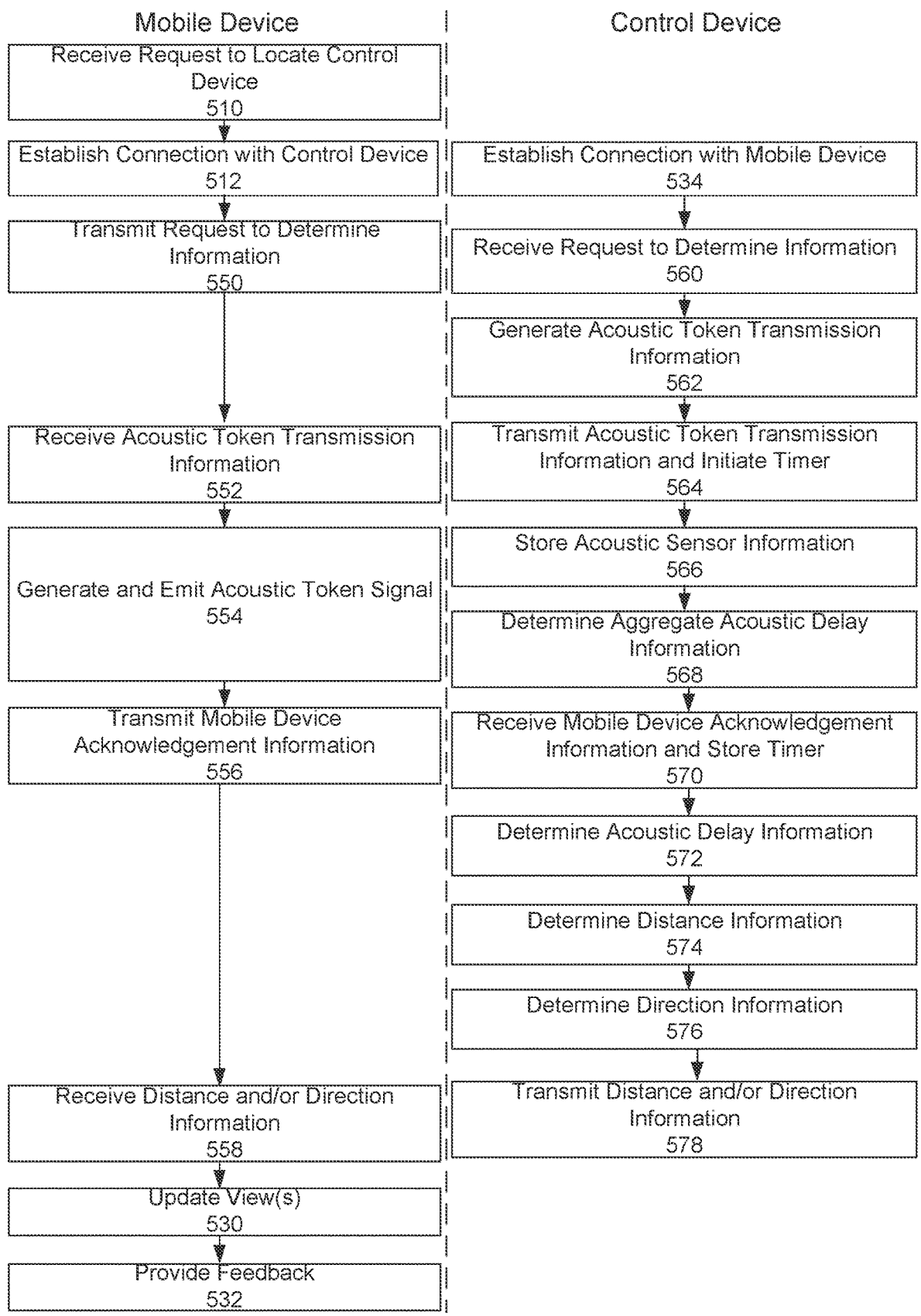

FIG. 5B illustrates processing operations that may be performed by the processor component 254 of a mobile device and processor component 214 of a control device with respect to the second mode.

With respect to a mobile device, at step 510, mobile device may receive request to locate control device. For example, mobile device 118-1 may receive request from a user to locate control device 116-1. At step 512, mobile device may establish connection with control device 512. For example, mobile device 118-1 may request to establish a direct or indirect wireless connection with the control device 116-1. At step 550, the mobile device may transmit request to determine information. For example, the mobile device 118-1 may transmit request to control device 116-1 to request the control device 116-1 to determine network and computation delay information, acoustic delay information, distance information, and/or mobile device direction information. At step 552, the mobile device may receive acoustic token transmission information. For example, mobile device 118-1 may receive acoustic token transmission information transmitted by control device 116-1 at step 562. At step 554, the mobile device may generate and emit acoustic token signal. For example, mobile device 118-1 may generate and emit acoustic token signal based on the acoustic token transmission information.

At step 556, the mobile device may transmit mobile device acknowledgement information. For example, the mobile device 118-1 may transmit the mobile device acknowledgment information to the control device 116-1. At step 558, the mobile device may receive distance and/or direction information. For example, the mobile device 118-1 may receive distance information and/or mobile device direction information from the control device 116-1 transmitted at step 578 and translate the mobile device direction information to control device direction information. At step 530, mobile device may update views. For example, mobile device 118-1 may update in substantially real-time the control device location UI view 450 and one or more UI elements in the control device location UI view 450. At step 532, mobile device may provide feedback. For example, mobile device 118-1 may provide haptic feedback based at least partially on the distance information and/or direction information.

With respect to a control device, at step 534, control device may establish connection with mobile device. For example, control device 116-1 may establish a direct or indirect wireless connection with the mobile device 118-1, in response to the request to establish a direct or indirect wireless connection by the mobile device 118-1 at step 512. At step 560, the control device may receive request to determine information. For example, control device 116-1 may receive request from mobile device 118-1 to determine network and computation delay information, acoustic delay information, distance information, and/or mobile device direction information. At step 562, the control device may generate acoustic token transmission information. For example, control device 116-1 may generate acoustic token transmission information, which may include, without limitation, waveform information, frequency information, phase shift information, power information, and/or duration information. At step 564, control device may transmit acoustic token information and initiate timer. For example, control device 116-1 may transmit acoustic token information to the mobile device 118-1 and substantially contemporaneous or simultaneous to the transmission, the control device 116-1 may also initialize or reset a high resolution timer.

At step 566, the control device may store acoustic sensor information. For example, control device 116-1 may store or buffer at least a portion of acoustic input information received from mobile device 118-1 via acoustic I/O component 216 and associated values of the high resolution timer as acoustic sensor information for each of the one or more acoustic sensors 216-1-e. At step 568, the control device may determine aggregate acoustic delay information. For example, control device 116-1 may determine the aggregate acoustic delay information by correlating and comparing the acoustic sensor information with the generated acoustic token transmission information. At step 570, the control device may receive mobile device acknowledgement information and store timer. For example, the control device 116-1 may receive mobile device acknowledgement information from mobile device 118-1 and substantially contemporaneous or simultaneous to the receipt, the control device 116-1 may store the value of the high resolution timer.

At step 572, control device may determine acoustic delay information. For example, the control device 116-1 may determine acoustic delay information for each of the one or more acoustic sensors 216-1-e based on the stored value of the high resolution timer and aggregate acoustic delay information for each of the one or more acoustic sensors 216-1-e. At step 574, control device may determine distance information. For example, the control device 116-1 may determine distance information based at least partially on acoustic delay information for at least one acoustic sensor of the one or more acoustic sensors 216-1-e and/or sound speed information.

At step 576, control device may determine direction information. For example, the control device 116-1 may determine direction information based at least partially on acoustic sensor arrangement information, the sound speed information, and/or one or more paired time delay information. At step 578, control device may transmit distance and/or direction information. For example, control device 116-1 may transmit distance information and mobile device direction information to the mobile device 118-1.

It may be appreciated that by repeatedly performing at least steps 514-532 and steps 536-540 of FIG. 5A and at least steps 550-532 and 560-578 of FIG. 5B in substantially real-time, a user of the control device location system 100 may quickly and easily locate the control device 116-1 with the assistance of at least the mobile device and/or control device of the control device location system 100. It may be further appreciated that while some of the above example embodiments illustrated in FIGS. 1, 2, 3A-B, 4A-B, and/or 5A-B may have been described in substantial detail with respect to mobile device 118-1 and control device 116-1, the example embodiments are not limited to those contexts and/or devices. As such, the example embodiments may similarly implemented in some or all mobile devices 118-a and/or control devices 116-a.

Example Computer System

Various embodiments and components therein can be implemented, for example, using one or more well-known computer systems, such as, for example, platform server device 120, client devices 110-a, mobile devices 118-a, display devices 112-a, and/or server devices 132-b shown in FIG. 1. Computer system 600 can be any well-known computer capable of performing the functions described herein. Computer system 600 may also be internal or external to a display device (e.g., display device 112-1, 112-2, etc.).

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 also includes user input/output device(s) 603, such as monitors, keyboards, pointing devices, etc., that communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Figure 6:
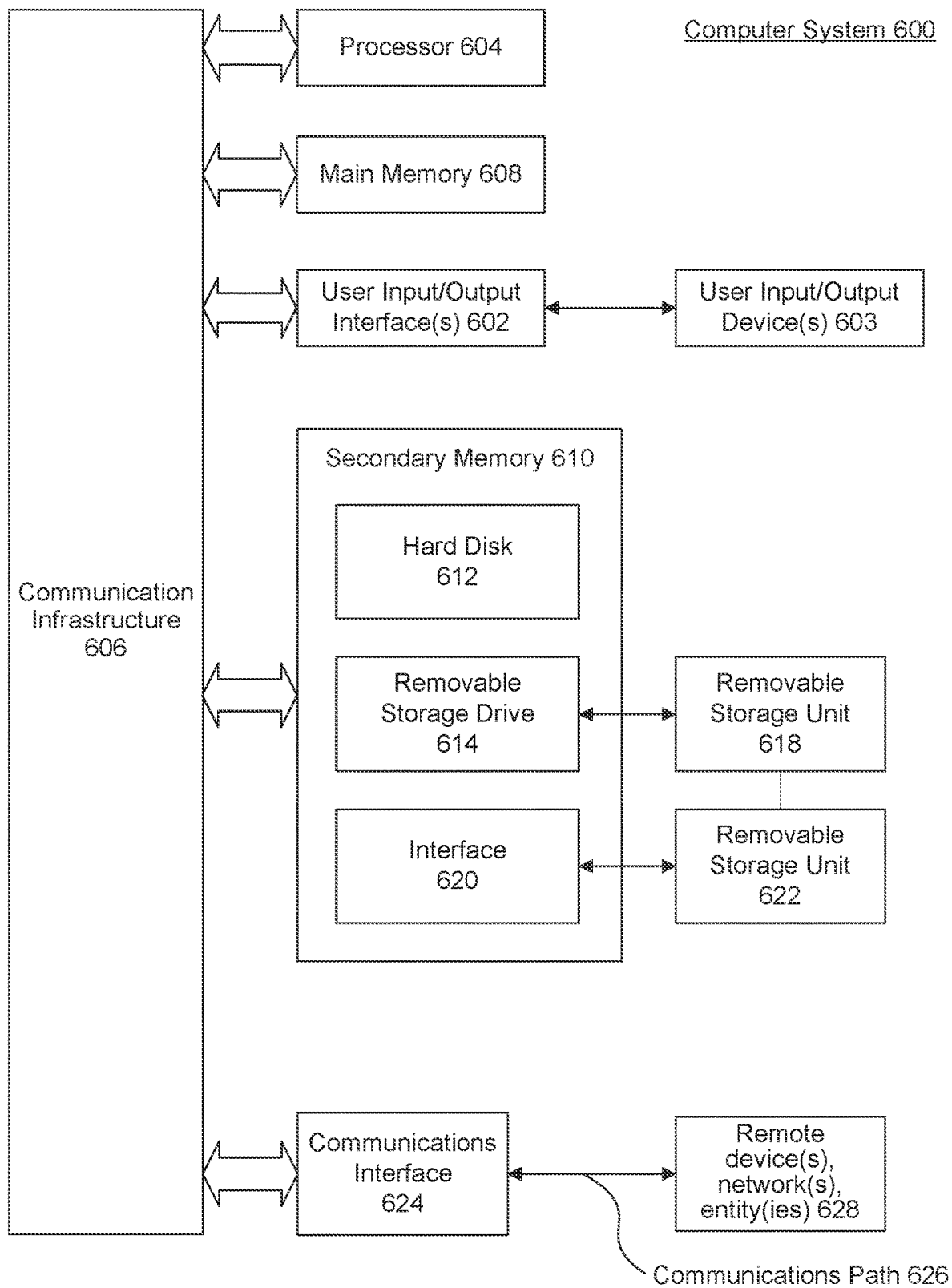
FIG. 6 illustrates an example computer system useful for implementing various embodiments.

Based on the teachings contained in this disclosure, it will be apparent to persons skilled in the relevant art(s) how to make and use embodiments of the invention using data processing devices, computer systems and/or computer architectures other than that shown in FIG. 6. In particular, embodiments may operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections may set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A mobile device comprising:
at least one processor configured to execute instructions for locating a control device, the instructions, when executed, causing the at least one processor to:
receive a request from a user to locate the control device;
establish a connection between the mobile device and the control device;
transmit, to the control device, a request for information to locate the control device through the connection between the mobile device and the control device; and
receive the requested information from the control device.

2. The mobile device of claim 1, wherein the instructions, when executed, further cause the at least one processor to:
provide visual presentation, haptic feedback, or auditory feedback of the information received from the control device to the user.

3. The mobile device of claim 2, wherein the instructions, when executed, further cause the at least one processor to:
visually present, based on the received information, one or more user interface (UI) views including one or more UI elements to enable the user to determine a physical location of the control device.

4. The mobile device of claim 1, wherein the information includes network and computation delay information, acoustic delay information, distance information, or direction information of the control device.

5. The mobile device of claim 4, further comprising:
a touch sensitive display component operatively coupled to the at least one processor, wherein the touch sensitive display component is configured to visually present, on a display of the mobile device, the direction information of the control device as a first graphical user interface (UI) element and the distance information of the control device as a second graphical UI element.

6. The mobile device of claim 5, wherein the first graphical UI element and the second graphical UI element are visually presented on the display of the mobile device and continuously updated based at least on the direction information of the control device and/or orientation information associated with the mobile device.

7. The mobile device of claim 1, wherein the mobile device further comprises:
a touch sensitive display component operatively coupled to the at least one processor, and wherein the instructions, when executed, further cause the at least one processor to receive touch input information from the user as the request to locate the control device.

8. The mobile device of claim 1, further comprising:
an acoustic I/O component coupled to the at least one processor, and wherein the instructions, when executed, further cause the at least one processor to:
receive acoustic token transmission information from the control device;
in response to receiving the acoustic token transmission information from the control device, generate acoustic output information; and
provide the acoustic output information to the acoustic I/O component.

9. The mobile device of claim 8, wherein the instructions, when executed, further cause the at least one processor to:
provide acknowledgement information to the control device.

10. The mobile device of claim 8, wherein the acoustic token transmission information further comprises at least one of: waveform information, phase information, power information, or any combination thereof.

11. A computer-implemented method performed by a mobile device, comprising:
receiving a request from a user to locate a control device;
establishing a connection between the mobile device and the control device;
transmitting, to the control device, a request for information to locate the control device through the connection between the mobile device and the control device; and
receiving the requested information from the control device.

12. The computer-implemented method of claim 11, further comprising:
providing visual presentation, haptic feedback, or auditory feedback of the information received from the control device to the user.

13. The computer-implemented method of claim 12, further comprising:
visually presenting, based on the received information, one or more user interface (UI) views including one or more UI elements to enable the user to determine a physical location of the control device.

14. The computer-implemented method of claim 11, wherein the information includes network and computation delay information, acoustic delay information, distance information, or direction information of the control device.

15. The computer-implemented method of claim 14, further comprising:
visually presenting, on a display of the mobile device, the direction information of the control device as a first graphical user interface (UI) element and the distance information of the control device as a second graphical UI element.

16. The computer-implemented method of claim 15, further comprising:
continuously updating based at least on the direction information of the control device and/or orientation information associated with the mobile device the first graphical UI element and the second graphical UI element visually presented on the display of the mobile device.

17. The computer-implemented method of claim 15, further comprising:
receiving acoustic token transmission information from the control device;
in response to receiving the acoustic token transmission information from the control device, generating acoustic output information; and
providing the acoustic output information to an acoustic I/O component of the mobile device.

18. A tangible non-transitory computer-readable medium having instructions stored thereon that, when executed by a computing device, cause the computing device to perform operations comprising:
- receiving a request from a user to locate a control device;
- establishing a connection between a mobile device and the control device;
- transmitting, to the control device, a request for information to locate the control device through the connection between the mobile device and the control device; and
- receiving the requested information from the control device.

19. The tangible non-transitory computer-readable medium of claim 18, wherein the operations further comprise:
- providing visual presentation, haptic feedback, or auditory feedback of the information received from the control device to the user.

20. The tangible non-transitory computer-readable medium of claim 18, wherein the information includes network and computation delay information, acoustic delay information, distance information, or direction information of the control device.

\* \* \* \* \*